(12) United States Patent
Lin

(10) Patent No.: US 6,650,788 B1
(45) Date of Patent: Nov. 18, 2003

(54) EXPANDABLE BINARY MORPHOLOGICAL EROSION OPERATOR

(75) Inventor: Reitseng Lin, Marlboro, NJ (US)

(73) Assignee: Lucent Technologies Inc., Murray Hill, NJ (US)

(*) Notice: Subject to any disclaimer, the term of this patent is extended or adjusted under 35 U.S.C. 154(b) by 0 days.

(21) Appl. No.: 09/407,934

(22) Filed: Sep. 28, 1999

(51) Int. Cl.⁷ .................................................. G06T 5/30
(52) U.S. Cl. ........................ 382/257; 382/304; 382/308
(58) Field of Search ................................. 382/256, 257, 382/258, 304, 307, 308

(56) References Cited

U.S. PATENT DOCUMENTS 4,301,443 A * 11/1981 Sternberg et al. . 340/146.3 MA
4,395,699 A * 7/1983 Sternberg ..................... 382/41
6,192,160 B1 * 2/2001 Sunwoo et al. ............. 382/257

* cited by examiner

Primary Examiner—Andrew W. Johns

(57) ABSTRACT

A binary morphological erosion operator image processor which operates on images of any size and dimension with a structuring element of any dimension and shape. The erosion operations are all processed in the 1D domain by first decomposing the image and structuring element into a series of 1D slices, and then further segmenting the structuring element into a plurality of shorter 1D segments. These segments are processed in parallel using an array of parallel processors. Once the erosion operations are completed, the resulting 1D slices are composed into a final eroded image.

24 Claims, 6 Drawing Sheets

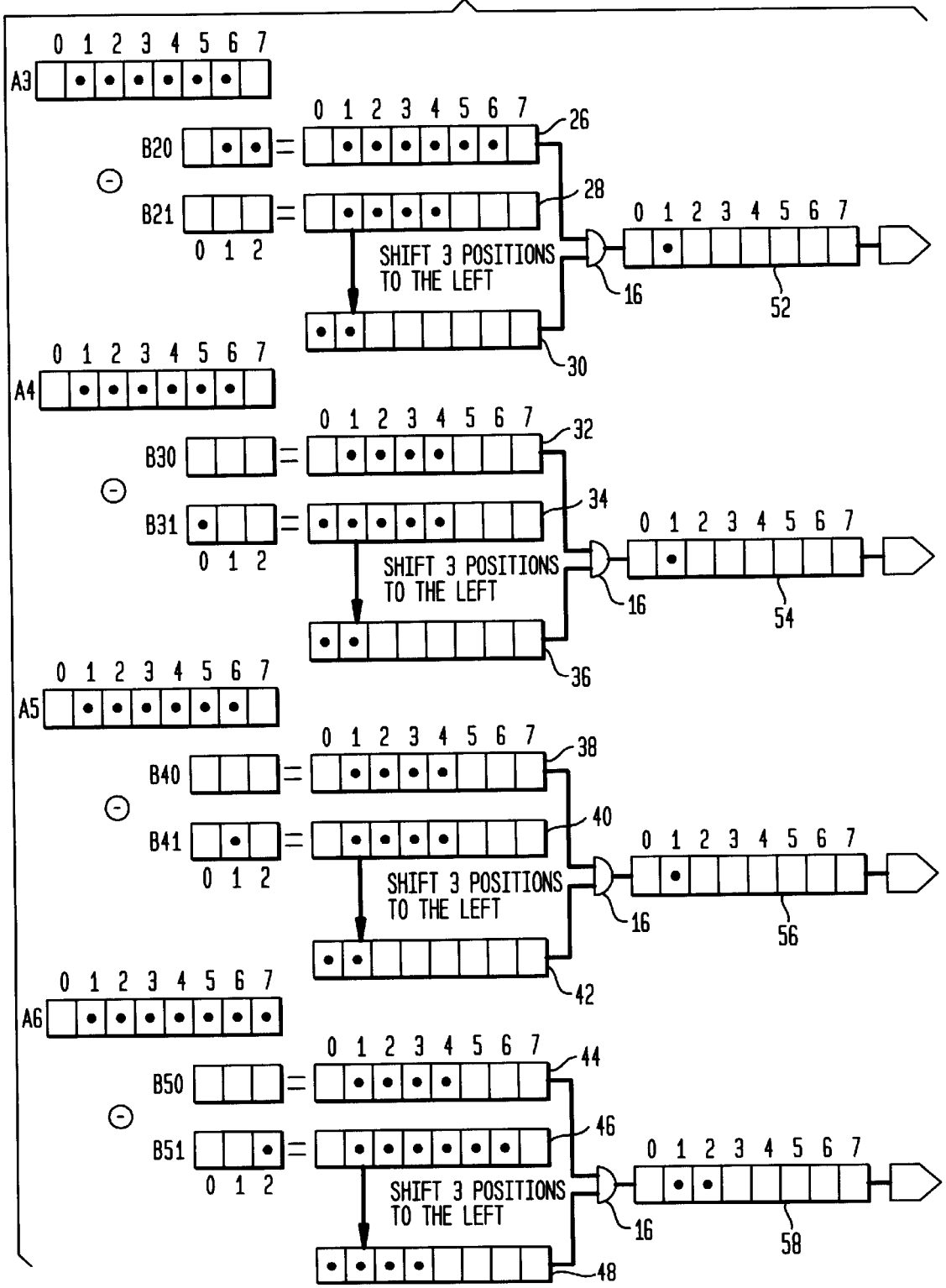

FIG. 2C

| SLICE OF STRUCTURE ELEMENT | ERODED IMAGE ||||||||
|---|---|---|---|---|---|---|---|---|
| | C0 | C1 | C2 | C3 | C4 | C5 | C6 | C7 |
| | SLICE OF IMAGE ||||||||
| B0 | A0 | A1 | A2 | A3 | A4 | A5 | A6 | A7 |
| B1 | A1 | A2 | A3 | A4 | A5 | A6 | A7 | A8 |
| B2 | A2 | A3 | A4 | A5 | A6 | A7 | A8 | A9 |
| B3 | A3 | A4 | A5 | A6 | A7 | A8 | A9 | A10 |
| B4 | A4 | A5 | A6 | A7 | A8 | A9 | A10 | A11 |
| B5 | A5 | A6 | A7 | A8 | A9 | A10 | A11 | A12 |

EXPANDABLE BINARY MORPHOLOGICAL EROSION OPERATOR

FIELD OF THE INVENTION

The present invention relates to the field of image processing systems, and more particularly to a digital system and method for binary morphological image processing.

BACKGROUND OF THE INVENTION

Conventional image processing systems are used in a variety of applications, including automatic object recognition systems which allow computers to identify particular objects or patterns in an image, as well as systems which enhance an image to make particular objects or patterns in the image more easily recognizable. Such systems typically operate by acquiring and digitizing an image into a matrix of pixels.

In non-grayscale, or binary, images each pixel is encoded in a single bit which is set to zero if the pixel is dark, or set to one if the pixel is illuminated. The image processor scans the digital image and processes the digital information to interpret the image.

One class of image processing systems is based on mathematical morphology, the science of processing and analyzing digital images through mathematical set transformations. Binary morphological processing was first investigated in the 1970s. See G. Matheron, *Random Sets and Integral Geometry*, Wiley, N.Y., 1975. Thereafter, the process was extended to grayscale morphology. See S. R. Sternberg, "Grayscale Morphology", *Computer Vision, Graphics, and Image Processing*, vol. 35, pp. 333–355, 1986.

Morphological image processing techniques can be expressed in terms of two basic transformation operations: dilation and erosion. The dilation operation propagates pixel states representative of relatively high intensities throughout some region of an image, while the erosion operation contracts regions of relatively high intensity in an image.

Morphological image processing operates by using the geometric information of an image which is exactly specified in an image probe, also called a structuring element. Using this known geometrical information, particular features in the image can be extracted, suppressed, or preserved by applying morphological operators. Structuring elements can be constructed in one or more dimensions. Examples of common three-dimensional (3D) structuring elements include spheres, cones, bars, cylinders, parabaloids, and polyhedrons.

However, morphological dilation and erosion operations suffer from a significant drawback. Specifically, they can be very computationally time-consuming depending on the size of the structuring element used. See, for example, Cytocomputer described in A. P. Reeves, "Survey: Parallel Computer Architectures for Image Processing", *Computer Vision, Graphics, and Image Processing*, vol. 25, pp. 68–88, 1984; and the Diff3 Analyzer described in M. D. Graham and P. E. Norgren, "The Diff3 Analyzer: a Parallel/Serial Golay Image Processor", *Real-Time Medical Image Processing*, M. Onoe et al. eds., pp.163, Plenum Press, New York, 1980. Other examples include the algorithms for decomposing a large two-dimensional (2D) structuring element described in, J. Xu, "Decomposition of Convex Polygonal Morphological Structuring Elements into Neighborhood Subsets", *IEEE Trans, Pattern Analysis and Machine Intelligence*, vol. 13, no. 2, 153–162, Feb. 1991.

SUMMARY OF THE INVENTION

A binary morphological image processor which performs morphological erosion operations on an input image of any dimension by using a one-dimensional (1D) operator that constructs a structuring element of any size and shape. Using translation invariance, the input image and structuring element are first decomposed until they are in the 1D domain. The 1D structuring element is then spatially decomposed into smaller segments which operate in parallel to transform the input image. Structuring elements of any size and shape can be composed to perform the parallel erosion operations on an image of any dimension. Processing multiple 1D operations in parallel using the present invention significantly reduces processing time as compared to conventional systems.

BRIEF DESCRIPTION OF THE FIGURES

FIGS. 2A & 2B show a series of steps of a binary erosion operation performed in accordance with the present invention in which the operation is performed using segmented structuring elements of equal size which operate in parallel.

FIG. 2C is a table showing the mapping of image slices to structural element slices for the binary erosion operation shown in FIGS. 2A–2B.

DETAILED DESCRIPTION OF THE DRAWINGS

The following detailed description relates to a binary morphological image processor and a method for performing the same. Images of any size or dimension can be processed using the present invention.

Figure 1:
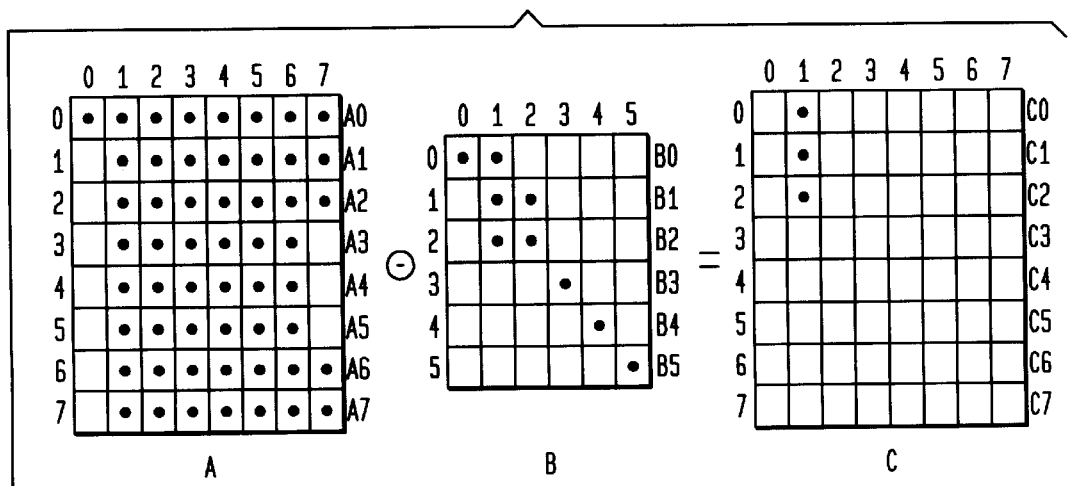
FIG. 1 shows an example of a conventional 2D binary erosion operation performed on a 2D image in accordance with the prior art.

FIG. 1 shows a conventional binary erosion operation performed on 2D image A which has 8×8 pixels. The structuring element B which is also shown in FIG. 1 and which contains binary data points arranged in a predetermined desired geometrical pattern chosen to facilitate the extraction of particular features of image A. In the erosion operation, denoted by the symbol ⊖, the structuring element B operates on image A to produce resulting eroded image C which is also shown in FIG. 1.

Mathematical morphological techniques, which are based on mathematical set theory, are used to perform this erosion operation. Using these techniques, a binary erosion operation can be computed as follows:

$$(A \ominus B)(x) = \text{AND}\{A(x+z) \text{ OR } B(z)\} \quad (1)$$

for all $z \in D_B$ and $x+z \in D_A$, where $D_A$ and $D_B$ are domains of image A and structuring element B, respectively.

The erosion of image A by structuring element B can also be computed as the union of the translation of image A by structuring element B as follows:

$$A \ominus B = \bigcap_{b \in B} (A)_{-b} \quad (2)$$

This erosion operation can also be computed by decomposing image A and structuring element B as follows:

$$A \ominus B = \bigcap_{i=0}^{l-1} \bigcap_{j=0}^{m-1} S_i[A] \ominus S'_j[B] \quad (3)$$

where $S_i[A]$ is a subset of A, with $$A = \bigcup_{i=0}^{l-1} S_i[A],$$

and $S'_j[B]$ is a superset of B, with $$B = \bigcap_{j=0}^{m-1} S'_j[B].$$

B can be a structuring element that contains or does not contain its origin,
and $S_i[A]$ and $S'_j[B]$ can be defined as follows:

$$S_i[A] = \begin{cases} A & L_{xi} \le x_i < H_{xi} \text{ for } i = 1, 2, 3, \dots, N \\ 0 & \text{otherwise} \end{cases} \quad (4)$$

$$S'_j[B] = \begin{cases} B & L_{xj} \le x_j < H_{xj} \text{ for } j = 1, 2, 3, \dots, M \\ 1 & \text{otherwise} \end{cases} \quad (5)$$

where $L_{xi}$ and $H_{xi}$ are the lower and upper bounds in coordinate $x_i$ for image A, and $L_{xj}$ and $H_{xj}$ are the lower and upper bounds in coordinate $x_j$ for structuring element B. The region where part of the original image has been retained is referred to as the preserved region. Although each $S_i[A]$ in Equation (4) has the same size as A, the erosion operation only has to cover a region extended from the preserved region by the size of the structuring element. This region is referred to as the extended region. If the size of the structuring element is M in the direction of coordinate $x_i$, the operation can only be performed in the region bounded by $L_{xi}-M+1$ and $H_{xi}+M-1$.

Using Equations (4) and (5), a 3D erosion operation can be converted to a set of 2D operations as follows:

$$C_i = \bigcap_j \{(A_{i+j} \ominus B_j)\} \quad (6)$$

wherein $C_i$, $A_i$, and $B_i$ are 2D slices of the eroded 3D image C, the 2D image A, and the 3D structuring element B, respectively. This equation can be applied to a multidimensional image and successive applications of the equation eventually reduce the operation to the 1D domain. Once the 1D domain is reached, the 1D structuring element $B_j$ can be further spatially decomposed into smaller segments. If structuring element B is shifted in a particular direction, the eroded image is shifted the same amount in the opposite direction as follows:

$$A \ominus (B)_x = (A \ominus B)_{-x} \quad (7)$$

If $B_j$ is segmented into n segments and each segment is denoted as $B_{jk}$, then $B_j = \cap B_{jk}$ and $$C_i = \bigcap_j \{(A_{i+j} \ominus B_j)\} = \bigcap_j \left\{ A_{i+j} \ominus \bigcap_k B_{jk} \right\} \quad (8)$$

Although a fixed size is preferred for all segments, the size of one segment may be different from that of another.

Assuming that the distance to the origin for each $B_{jk}$ is k, and assuming that the starting position of each $B_{jk}$ is its origin, the coordinate of each structuring element segment is shifted to the right for k positions. For purposes of convenience, the same symbol $B_{jk}$ will be used for the shifted structuring element and Equation (8) will then be modified as follows:

$$C_i = \bigcap_j \left\{ A_{i+j} \ominus \bigcap_k (B_{jk})_k \right\} = \bigcap_j \bigcap_k \{(A_{i+j} \ominus B_{jk})_{-k}\} \quad (9)$$

Equation (9) shows that any size structuring element can be composed by selecting a set of $B_{jk}$.

FIGS. 2A–2C and 3 show the steps for performing a binary erosion operation according to the present invention in which the operation is performed using segmented structuring elements of equal size which operate in parallel. In order to obtain the eroded image C, the slices of the eight slices labeled C0, C1, C2, C3, C4, C5, C6 and C7 which comprise this image must each be translated by operating on image A with structuring element B. In the example shown in FIGS. 2A–2C and 3, the upper and lower bounds of structuring element B exclude slices A0 and A7, thereby limiting the region operated on by structuring element B to the six slices A1 through A6.

Figure 2A:
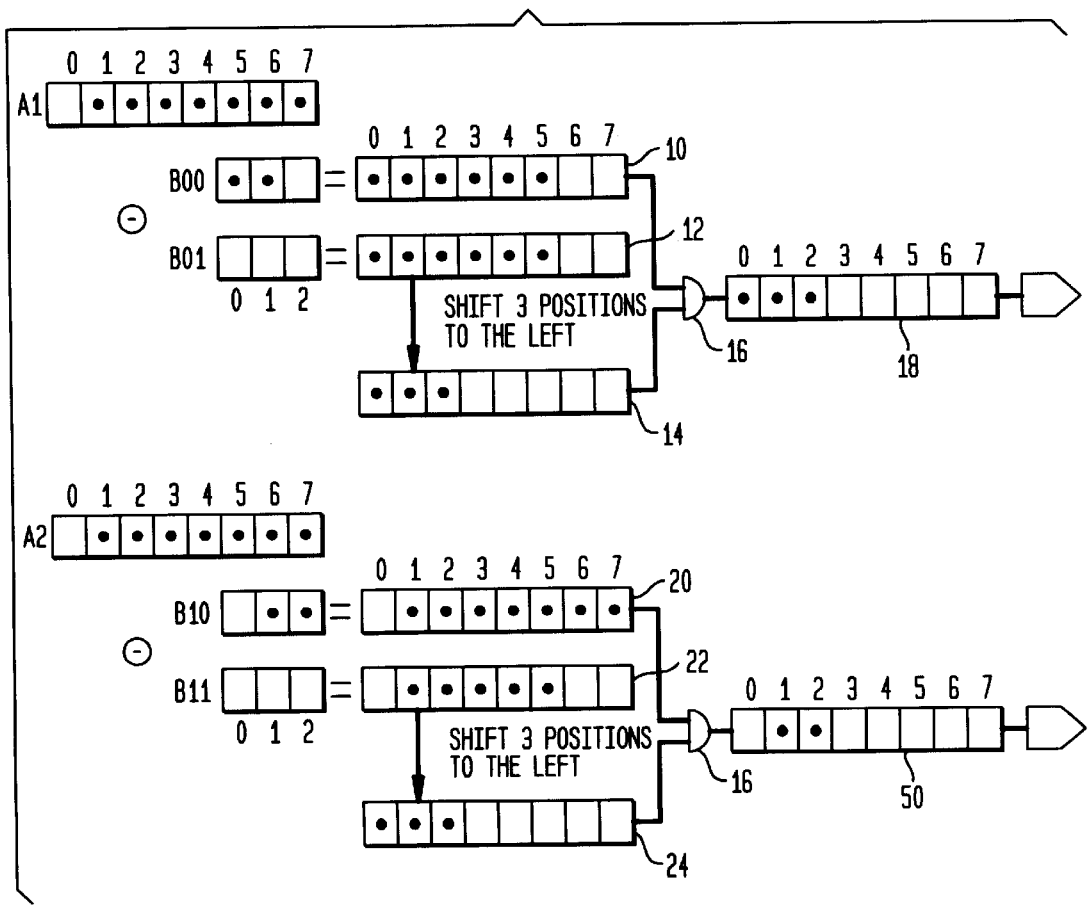
Figure 3:
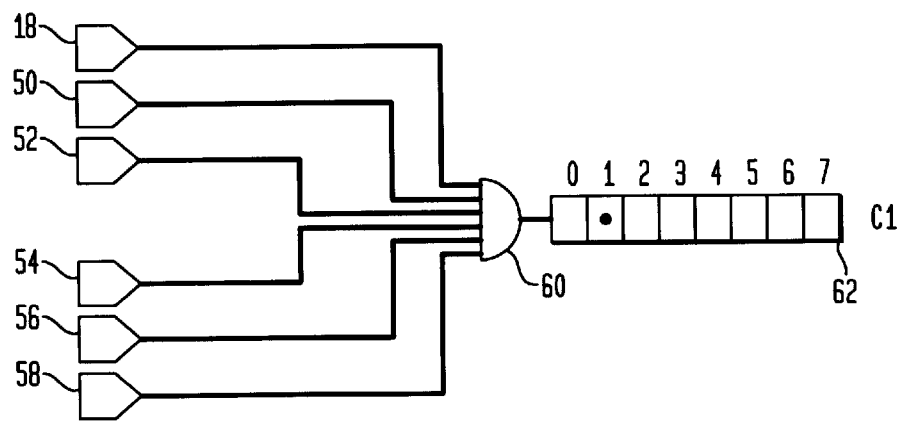
FIG. 3 shows a final step of the 2D binary erosion operation shown in FIG. 1.

As shown in FIGS. 2A, 2B, and 3, slice C1 is the first slice of eroded image C to be determined by operating on the A1 slice of image A with slice B0 of structuring element B. To complete the construction of the C1 slice, slice A2 is operated on by slice B1, slice A3 is operated on by slice B2, slice A4 is operated on by slice B3, slice A5 is operated on by slice B4, and slice A6 is operated on by slice B5. The mapping of structuring element B slices to image A slices to determine of the slices of eroded image C is shown in table form in FIG. 2C.

To both improve the speed of the erosion operation and to decrease the complexity of the computations involved, the present invention divides the erosion operation into smaller operations which are performed in parallel. As shown in FIGS. 2A–2B, this is accomplished by dividing each slice of structuring element B into two segments which operate in parallel thereby resulting in a processing speed which is faster than can be attained using a single larger computational operation. For example, structuring element slice B0 is split into two equal segments of three pixels each labeled B00 and B01, respectively, which then operate on the seven pixels of slice A1 to yield the results shown in slices 10 and 12. This parallel operation enables resultant erosion slices C0–C7 to be generated simultaneously. Alternatively, structuring element B could be split into more than two segments.

As shown in FIGS. 2A, 2B and 3, pixels that are blank are background pixels having a value of 0, and pixels with dots are foreground pixels having a value of 1. The location of an intermediate pixel produced using the present invention is computed as the difference of the location of a particular pixel in image A and the location of a particular pixel in structuring element B that operates on that particular pixel in image A. The value of the intermediate pixel so produced is computed by first performing a logical OR operation on the pixels in image A and structuring element B, and then performing a logical AND operation on the pixels resulting from the logical OR operation.

For example, the first pixel produced at location 3 in slice 10 from the logical OR operation of the foreground pixel at location 0 of structuring element segment B00 on the foreground pixel at location 3 of image slice A1 is a foreground pixel. The second pixel produced at location 3 of slice 10 from the logical OR operation of the foreground pixel at location 1 of structuring element segment B00 on the foreground pixel at location 4 of image slice A1 is a foreground pixel. The third and final pixel produced at location 3 of slice 10 from the logical OR operation of the background pixel at location 2 of structuring element segment B00 on the foreground pixel at location 5 of image slice A1 is a foreground pixel. A logical AND operation is then performed on these three pixels to determine the resulting pixel at location 3 of slice 10, which is a foreground pixel.

While structuring element segment B00 operates on A1 to produce slice 10, structuring element segment B01 also operates on A1 in the same exact manner to produce slice 12. The result in slice 12 is then shifted three positions employing Equation (9) to produce shifted slice 14. Slices 10 and 14 are then processed through an AND operation by AND operator 16 to yield resultant image slice 18. The operations just described are also performed on image slices A2, A3, A4, A5 and A6. Each of these operations can be performed in parallel.

When image slices A1 through A6 have all been translated as described above, resulting image slices 18, 50, 52, 54, 56 and 58 are generated. As shown in FIG. 3, AND operator 60 then performs an AND operation on these resulting image slices to produce final eroded image slice C1. The foregoing steps are repeated for all the other slices in image A using appropriate structuring elements B as mapped in FIG. 2C to obtain eroded image slices C0–C7 shown in FIG. 1.

Figure 4:
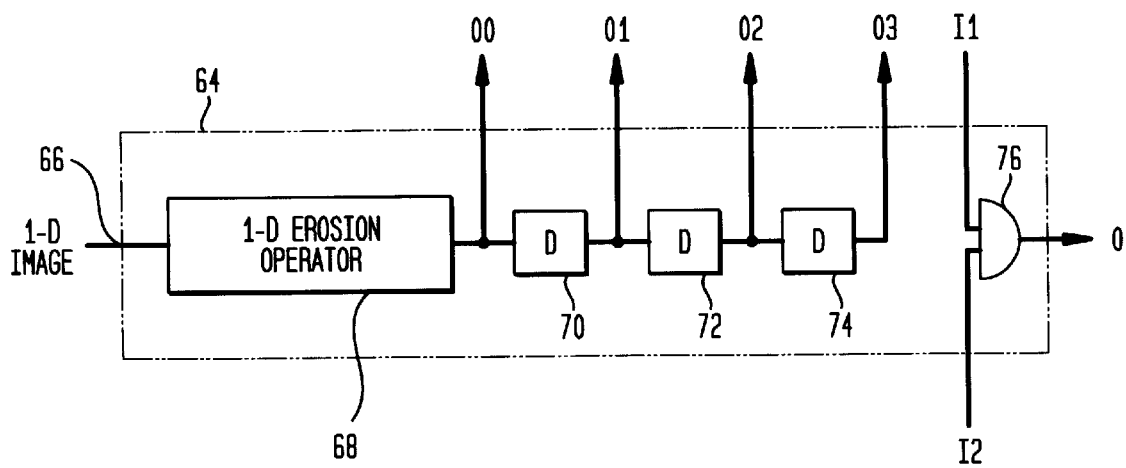
FIG. 4 shows a first embodiment of an erosion operator for implementing the present invention utilizing a 3×1 expandable erosion operator.

FIG. 4 shows a first embodiment of an erosion operator for implementing the resent invention in which expandable 3×1 erosion operator 64 determines the erosion of individual 1D slices of image A by employing a single three pixel segment of a 1D structuring element slice, such as B0.

Figure 5:
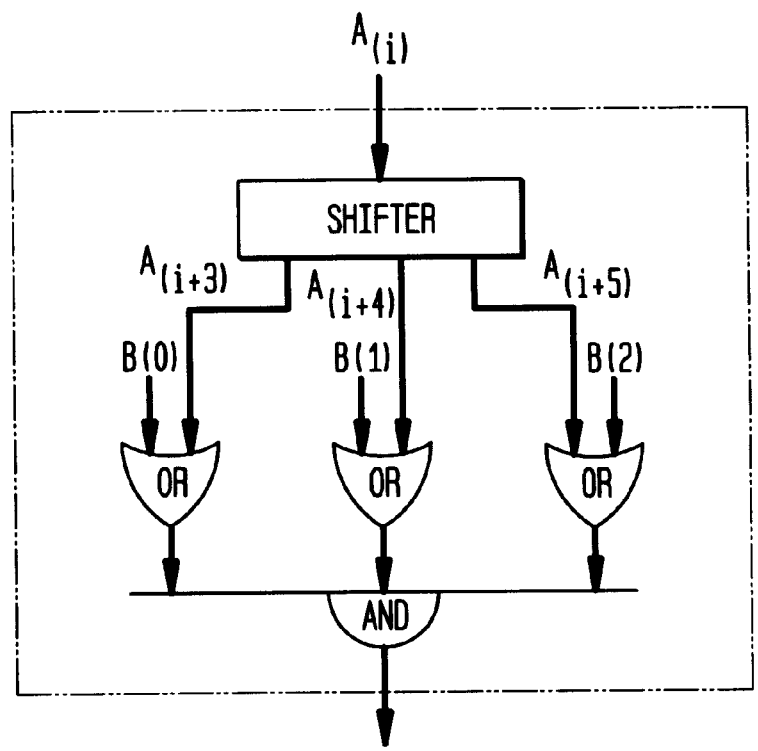
FIG. 5 shows a simplified embodiment of the processing unit used in the 3×1 expandable erosion operator shown in FIG. 4.

Erosion operator 64 includes an input port 66, which receives a one-dimensional slice of the image to be processed. The erosion operator 64 performs the above-described functions. Processing unit 68 can be simplified as shown in FIG. 5. As shown in FIG. 4, blocks 70, 72, and 74 are delay elements which store a signal at their input lines for a certain period of time before transmitting the signal to their respective output lines. In the present invention, the delay time is the time required to generate the next eroded pixel by the non-expandable 3×1 erosion operation. Thus, if the output from the non-expandable operator is g(i), then the output at output lead O0 is g(i), at output lead O1 is g(i−1), and at output lead O2 is g(i−2). AND operator 76 performs an AND operation on inputs I1 and I2, and transmits the result to output lead O.

Figure 6:
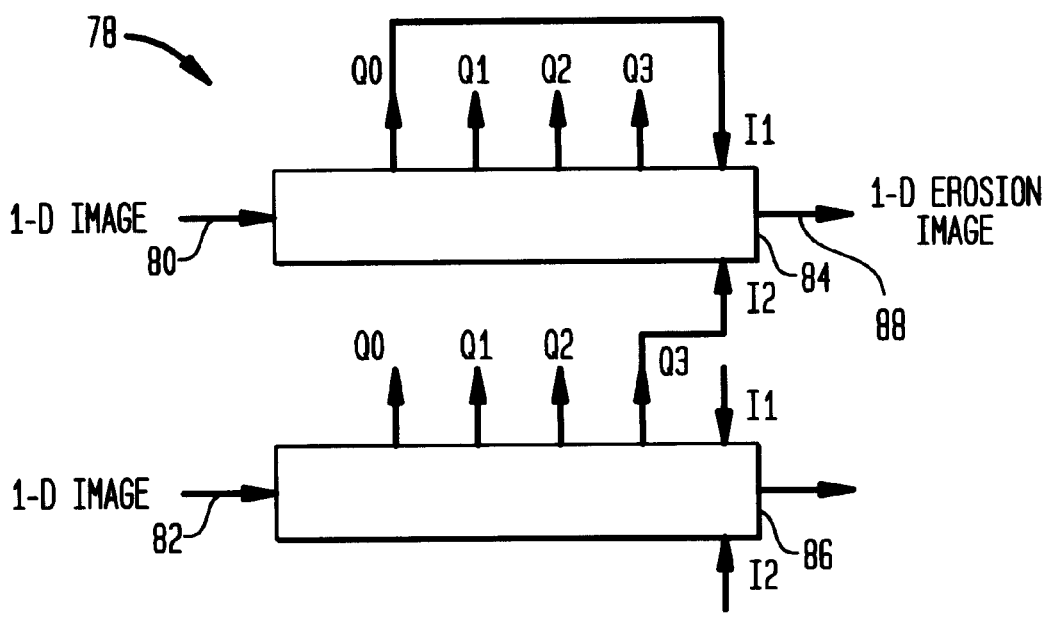
FIG. 6 shows a second embodiment of an erosion operator for implementing the present invention utilizing a 6×1 erosion operator composed of two of the 3×1 erosion operators shown in FIG. 4.

FIG. 6 shows a second embodiment of an erosion operator for implementing the present invention in which a pair of 3×1 erosion operators 64 shown in FIG. 4 are coupled together to form 6×1 erosion operator 78. Image slice A6 is input at ports 80 and 82. Expandable erosion operators 84 and 86 are configured to perform the B00 and B01 structuring element segment operations, respectively. The output of the expandable erosion operator 86 consists of shifted result 14 shown in FIG. 2A, which is output to the 12 input of the expandable erosion operator 84. The result of the B00 operation 10 shown in FIG. 2A, is on output O0 which is coupled to input I1. Both inputs I1 and I2 are coupled to AND operator 76 shown in FIG. 4, and output 88 from AND operator 76 corresponds to erosion output 18 in FIG. 2A.

Figure 7:
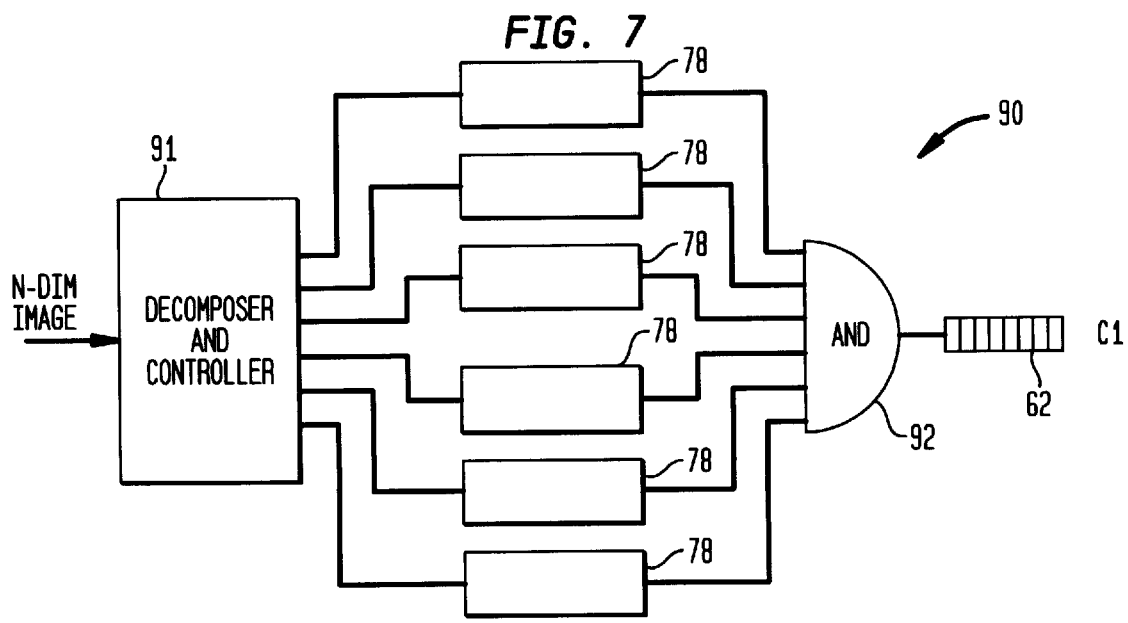
FIG. 7 shows a third embodiment of an erosion operator for implementing the present invention.

FIG. 7 shows a third embodiment of an erosion operator for implementing the present invention in which erosion operator 90 performs the erosion operation shown in FIGS. 2A–2B. Six separate 6×1 erosion operators 78 shown in FIG. 5 are coupled in parallel to AND operator 92. Decomposer and controller unit 91 receives the image and decomposes it into 1D slices. AND operator 92 performs the same function as AND operator 60 shown in FIG. 3. Specifically, it receives the six 8×1 erosion outputs which correspond to the six erosion outputs 18, 50, 52, 54, 56 and 58 shown in FIGS. 2A–2B to produce a one dimensional slice 62 of the final eroded image C1 shown in FIG. 3.

Figure 8:
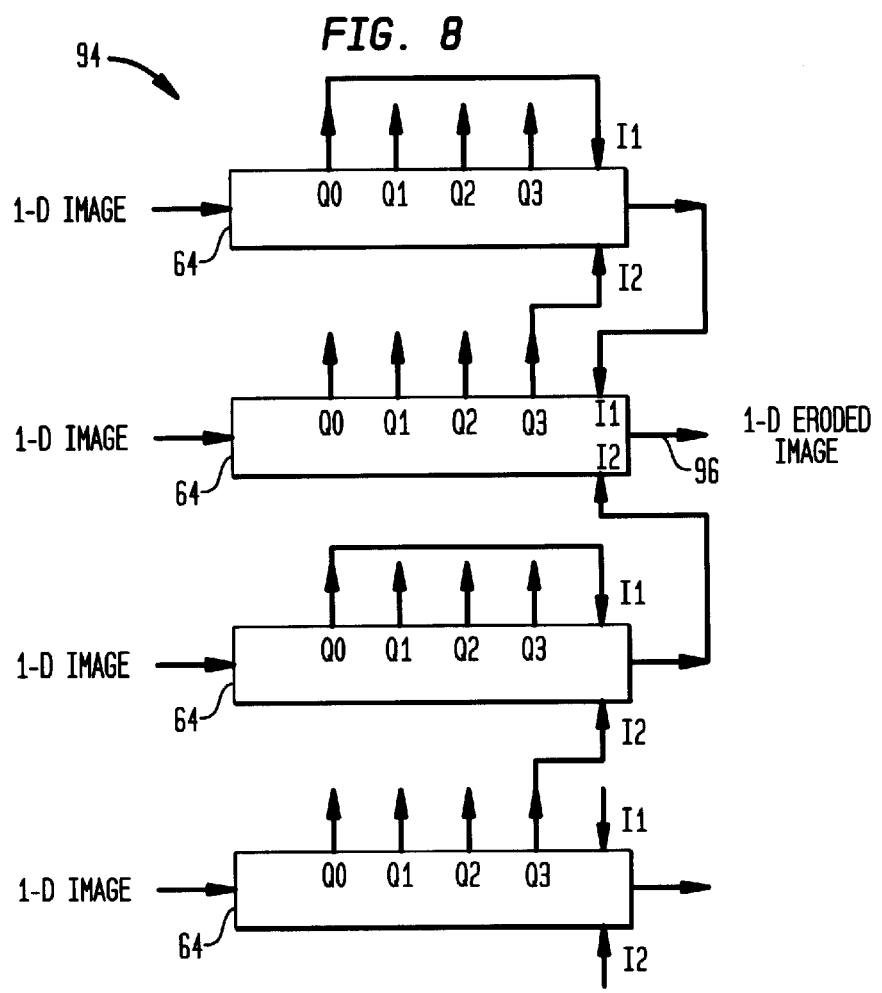
FIG. 8 shows a fourth embodiment of an erosion operator for implementing the present invention utilizing a 6×1 erosion operator composed of four of the 3×1 erosion operators shown in FIG. 4.

FIG. 8 shows a fourth embodiment of an erosion operator according to the present invention which a 6×2 erosion operator 94 comprised of four expandable 3×1 erosion operators 78 shown in FIG. 4 are coupled in parallel to generate a single output 96.

By composing appropriate combinations of the basic expandable erosion operator 64, the present invention can process images without regard to their size or dimensionality by using structuring elements of any size and dimension. Image and structuring elements having more than two dimensions, must first be split into individual 1D slices as described above in order to be processed using the present invention. Since images and structuring elements of any size and dimension can be deconstructed into a combination of 1D slices which can be processed by a combination of erosion operators 64, and since short 1D segments of structuring elements involve relatively simple computations, erosion operator 64 operates relatively quickly using relatively inexpensive components, thereby making it more feasible to employ multiple erosion operators 64 which work together in parallel. This results in a significant improvement in processing speed for many applications, particularly those involving large and complex images and structuring elements. Various conventional techniques may be used to implement the present invention such as software, or alternatively conventional Application Specific Integrated Circuits (ASICs).

Erosion operators other than those shown can be implemented using the teachings of the present invention. Numerous modifications to and alternative embodiments of the present invention will be apparent to those skilled in the art in view of the foregoing description. Accordingly, this description is to be construed as illustrative only and is for the purpose of teaching those skilled in the art the best mode of carrying out the invention. Details of the structure may be varied substantially without departing from the spirit of the invention and the exclusive use of all the modifications, which come within the scope of the appended claims, is reserved.

What is claimed is:

1. A method for producing an eroded binary image, comprising the steps of:

defining a structuring element for an uneroded image comprised of a plurality of binary pixels;

segmenting the structuring element into at least two segments; and producing an eroded image comprised of a plurality of binary pixels by operating on the uneroded image with the at least two segments of the structuring element, wherein the at least two segments of structuring element operate in parallel to reduce the computational complexity of the erosion operation and increase the speed of the erosion operation.

2. The method according to claim 1, wherein the uneroded image, the structuring element and the eroded image are all N-dimensional.

3. The method according to claim 1, wherein the structuring element and the uneroded image are each decomposed into a plurality of slices of pixels which produce the eroded image, wherein the eroded image is comprised of a plurality of slices of pixels.

4. The method according to claim 3, further comprising the step of combining the plurality of slices of the eroded image to attain the eroded image of the uneroded image.

5. A method for producing an N-dimensional eroded binary image, comprising the steps of:
(a) defining an N-dimensional structuring element for an N-dimensional uneroded image, wherein both the structuring element and the image are comprised of a plurality of binary pixels;
(b) decomposing both the N-dimensional structuring element and the uneroded image into a plurality of one-dimensional slices of pixels;
(c) segmenting each one of the plurality of one-dimensional slices of the structuring element into at least two segments;
(d) producing a plurality of one-dimensional slices of an eroded binary image by operating on selected ones of the plurality of one-dimensional slices of the uneroded image with the plurality of one-dimensional slices of the structuring element;
(e) combining the plurality of one-dimensional slices of the uneroded image to attain an N-dimensional eroded binary image of the uneroded image, wherein the at least two segments of each one of the plurality of one-dimensional slices of the structuring element operate in parallel to reducing the computational complexity of the erosion operation and to increase the speed of the erosion operation.

6. A method for producing an N-dimensional eroded image from an N-dimensional uneroded image, comprising the steps of:
(a) defining an N-dimensional structuring element for an N-dimensional uneroded image, wherein both the structuring element and the uneroded image are comprised of a plurality of binary pixels;
(b) decomposing both the N-dimensional structuring element and the N-dimensional uneroded image into a plurality of one-dimensional slices of pixels;
(c) segmenting each one of the plurality of one-dimensional slices of the structuring element into at least two segments;
(d) employing the at least two segments of a first one of the plurality of one-dimensional slices of the structuring element to operate in parallel on a first one of the plurality of one-dimensional slices of the uneroded image;
(e) shifting the result of the parallel operation of one of the at least two segments of the first one of the plurality of one-dimensional slices of the structuring element;

(f) performing a first AND operation on the shifted result to generate a plurality of one-dimensional erosion arrays; and
(g) performing a second AND operation on the plurality of one-dimensional erosion arrays to generate a single one-dimensional slice of the erosion of the N-dimensional uneroded image.

7. The method according to claim 6, further comprising the steps of:
repeating steps (d) through (g) for each one of the remaining one-dimensional slices of the image to generate a plurality of one-dimensional slices of the erosion of the uneroded image; and
assembling each one of the plurality of one-dimensional slices of the erosion of the uneroded image into an N-dimensional eroded image.

8. The method according to claim 6, wherein each one of the at least two segments of each one of the plurality of one-dimensional slices of the structuring element are comprised of an identical number of pixels.

9. The method according to claim 6, wherein step (e) further comprises the steps of:
defining an origin corresponding to the location of a first pixel in a first one of the at least two segments of the first one of the plurality of one-dimensional slices of the structuring element; and
shifting the other segments of the at least two segments of the first one of the plurality of one-dimensional slices of the structuring element by the number of pixel locations which will cause the location of the first pixel in the other segments to correspond to location of the first pixel in the first one of the at least two segments of the first one of the plurality of one-dimensional slices of the structuring element.

10. The method according to claim 6, wherein step (b) includes the step of calculating the equation $C_i = \cap \{(A_{i+j} \ominus B_j)\}$, wherein $C_i$, $A_i$, and $B_i$ and are (N−1) dimensional slices of the eroded N-dimensional image C, the N-dimensional image A, and the N-dimensional structuring element B, respectively.

11. The method according to claim 6, wherein steps (e), (f) and (g) include the step of calculating the equation $C_i =_j \cap \{(A_{i+j} \ominus B_j)\} =_j \cap \{A_{i+j} \ominus_k \cap (B_{jk})_k\} =_j \cap_k \cap A_{i+j} \ominus B_{jk})_{-k}\}$.

12. The method according to claim 6, wherein the plurality of one-dimensional slices of the structuring element perform a translation operation on the plurality of one-dimensional slices of the uneroded image.

13. The method according to claim 6, wherein step (d) further comprises the step of determining an intermediate binary value for each pixel in the eroded image by first performing a logical OR operation and then performing a third logical AND operation, wherein the third logical AND operation is performed before the first and second logical AND operations are performed.

14. An image processing system for producing an eroded binary image, comprising:
a structuring element defined for an uneroded image comprised of a plurality of binary pixels;
segmenting means for segmenting the structuring element into at least two segments; and
erosion means for producing an eroded image comprised of a plurality of binary pixels by operating on the uneroded image with the at least two segments of the structuring element, wherein the at least two segments of structuring element operate in parallel to reduce the computational complexity of the erosion operation and increase the speed of the erosion operation.

15. The image processing system according to claim 14, wherein the uneroded image, the structuring element and the eroded image are all N-dimensional.

16. The image processing system according to claim 14, further comprising a decomposing means for decomposing both the structuring element and the uneroded image into a plurality of slices of pixels which produce the eroded image, wherein the eroded image is comprised of a plurality of slices of pixels.

17. The method according to claim 16, further comprising combining means for combining the plurality of slices of the eroded image to attain the eroded image of the uneroded image.

18. An image processing system for processing an image comprised of an array of binary pixels, comprising:
- an N-dimensional structuring element comprised of an array of pixels;
- a decomposing unit for decomposing both an N-dimensional image comprised of an array of binary pixels and the N-dimensional structuring element into a plurality of one-dimensional slices of pixels;
- segmenting means for segmenting each one of the plurality of one-dimensional slices of the structuring element into at least two segments;
- operating means by which a first one of the at least two segments of the plurality of one-dimensional slices of the structuring element operate in parallel on a first one of the plurality of one-dimensional slices of the image;
- means for shifting the result of the operating means;
- a plurality of intermediate AND operators coupled to the operating means and to the shifting means for generating a plurality of one-dimensional erosion arrays; and
- a final AND operator coupled to the intermediate AND operators for generating a single one-dimensional slice of the erosion of the image.

19. The system according to claim 18, further comprising means for assembling each one-dimensional slice of the erosion of the image into an N-dimensional eroded image.

20. The system according to claim 18, wherein the shifting means shifts each one of the at least two segments of the plurality of one-dimensional slices of the structuring element by the same number of pixels comprising each segment.

21. The system according to claim 18, wherein the image and structuring element are each comprised of a two-dimensional array of binary pixels.

22. The system according to claim 18, wherein the operating means includes means for the at least two segments of the first one of the plurality of one-dimensional slices of the structuring element to perform a translation operation on the first one of the plurality of one-dimensional slices of the image.

23. An expandable one-dimensional binary morphological erosion operator, comprising:
- at least one input port for receiving a plurality of one-dimensional slices of an image;
- a plurality of erosion processing units coupled to the at least one input port for performing an erosion operation on each one of the plurality of one-dimensional slices of the uneroded image using a predetermined structuring element, wherein the predetermined structuring element is decomposed into a plurality of one-dimensional slices which are segmented into at least two segments which operate in parallel on the plurality of one-dimensional slices of the image, and wherein each erosion processing unit generates a one-dimensional output; and
- at least one intermediate AND processing unit coupled to the plurality of erosion processing units, wherein each one of the at least one intermediate AND processing units generate a one-dimensional erosion output.

24. The erosion operator according to claim 19, further comprising a final AND processing unit coupled to the at least one intermediate AND processing unit, wherein the final AND processing unit generates a one-dimensional slice of the eroded image.

* * * * *